Figure 1:
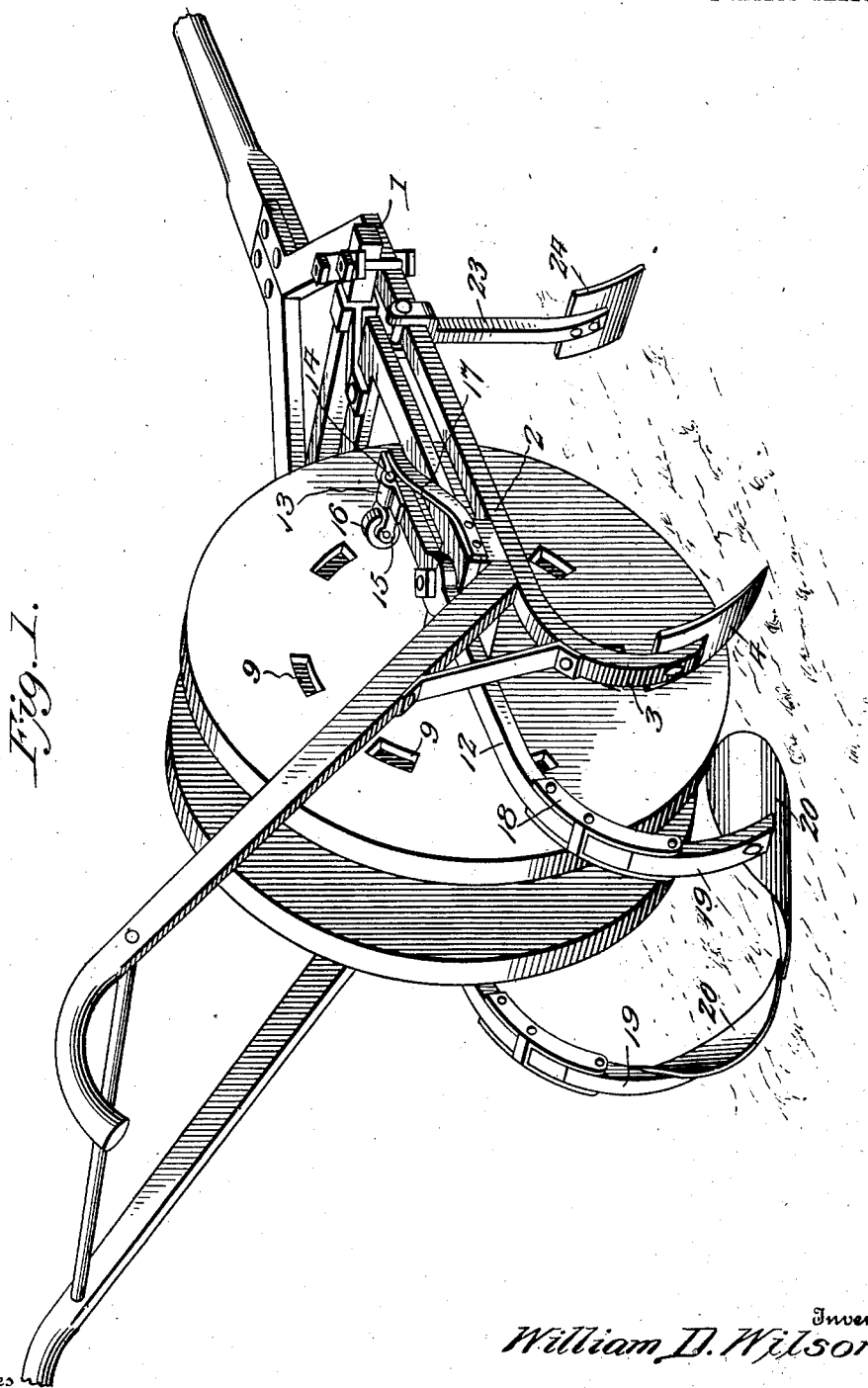

No. 731,990. PATENTED JUNE 23, 1903.
W. D. WILSON.
COTTON CHOPPER AND CULTIVATOR.
APPLICATION FILED JAN. 9, 1903.
NO MODEL. 2 SHEETS—SHEET 1.

Witnesses
Edwin G. McKee
Herbert D. Lawson

Inventor
William D. Wilson
By Victor J. Evans
Attorney

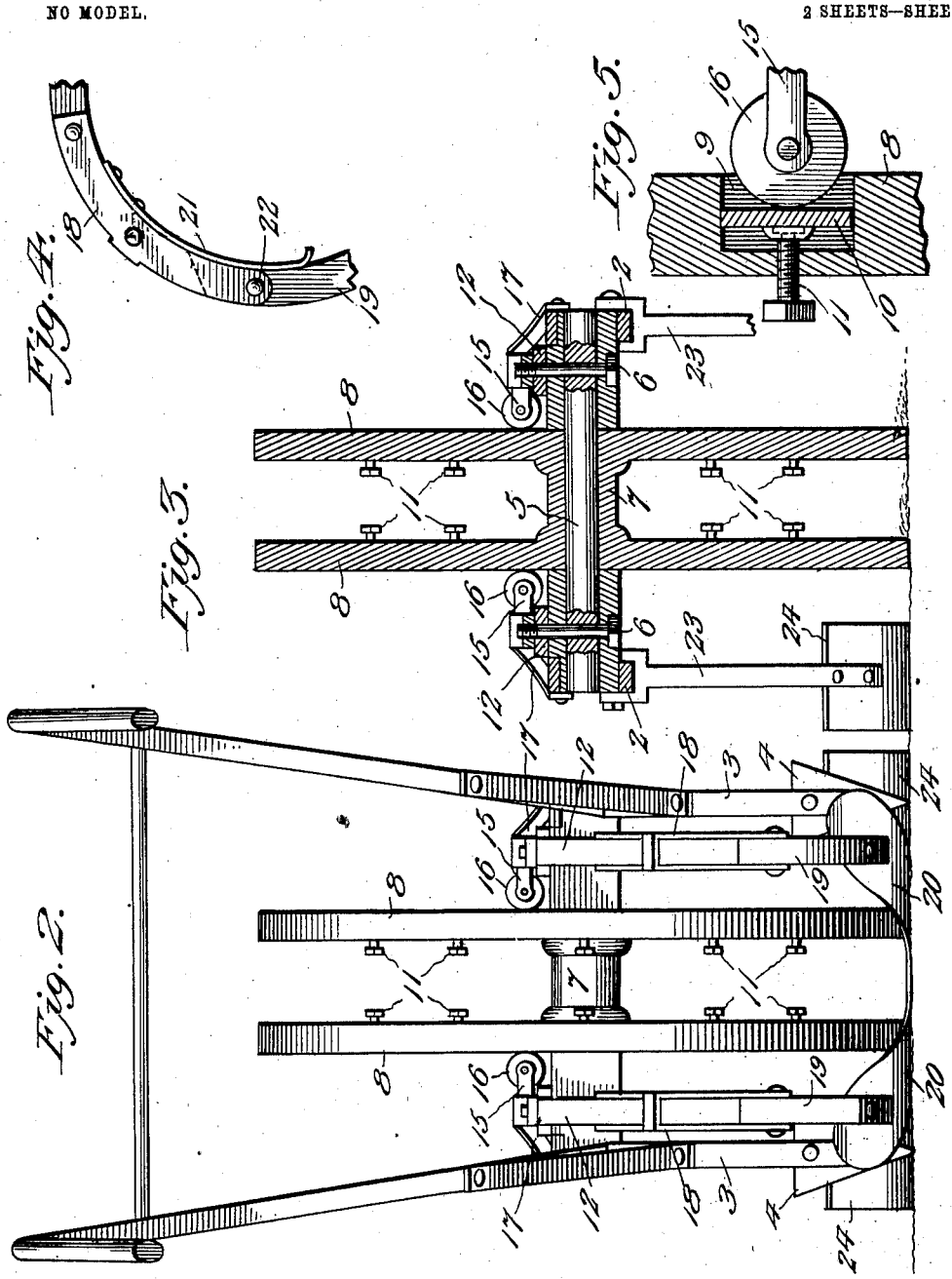

No. 731,990. Patented June 23, 1903.

UNITED STATES PATENT OFFICE.

WILLIAM D. WILSON, OF BOONEVILLE, ARKANSAS.

COTTON CHOPPER AND CULTIVATOR.

SPECIFICATION forming part of Letters Patent No. 731,990, dated June 23, 1903.

Application filed January 9, 1903. Serial No. 138,412. (No model.)

*To all whom it may concern:*

Be it known that I, WILLIAM D. WILSON, a citizen of the United States, residing at Booneville, in the county of Logan and State of Arkansas, have invented new and useful Improvements in Cotton Choppers and Cultivators, of which the following is a specification.

My invention relates to new and useful improvements in a combined cotton chopper, scraper, and cultivator; and its object is to provide a simple and durable device of inexpensive construction having means whereby undesirable vegetable growth may be forced down upon the ground and covered by earth conveyed from each side of the device.

A further object is to provide novel means for guiding the earth into proper position upon the overturned vegetation.

A further object is to provide mechanism whereby the hoes employed for guiding the earth may be simultaneously moved from or toward each other at desired intervals.

With the above and other objects in view the invention consists in the further novel construction and combination of parts hereinafter more fully described and claimed, and illustrated in the accompanying drawings, showing the preferred form of my invention, and in which—

Figure 1 is a perspective view of my improved combined cotton chopper, cultivator, and scraper. Fig. 2 is an end elevation thereof. Fig. 3 is a central vertical transverse section. Fig. 4 is a detail view showing the connection between one of the hoes and its operating-arm, and Fig. 5 is an enlarged section through a portion of one of the disks of the machine and showing a recess and a roller in position therein.

Referring to the figures by numerals of reference, 1 is a frame of suitable construction, from the side bars 2 of which extend hangers 3, having plows 4 connected thereto. A shaft 5 is mounted upon the frame 2 and is secured thereto in any suitable manner, as by means of bolts 6. Loosely mounted upon this shaft is a sleeve 7, upon the ends of which are arranged disks 8, which serve as wheels for the machine. Each disk is provided within its outer face at desired intervals with recesses 9, within each of which is seated a block 10, to which is swiveled one end of an adjusting-screw 11, which is mounted in the rear face of the disk. By means of this screw the block 10 may be adjusted from or toward the inner end of the recess within which it is mounted.

The bolts 6 before referred to are preferably employed as pivots for arms 12, which are arranged horizontally upon the frame 1 and are located at opposite ends of the sleeve 7. The forward end of each arm 12 is provided with a bracket 13, within which is mounted the stem 14 of a yoke 15, within which is journaled a roller 16. This roller is so located that when the disks 8 are revolved the recesses 9 therein will be brought successively into position at the side thereof. A spring-strip 17 is secured to the side of frame 1 and bears upon the arm 12, serving to hold the roller normally pressed against the face of the disk 8 adjacent thereto. The rear end of the arm 12 is preferably curved downward and secured within the strips 18, between which is pivoted a stock 19, extending upward from and secured to a hoe 20 of peculiar construction. The outer ends of the hoes are located in rear of the plows 4 and are adapted to gather up earth which has been loosened by said plows and guide it inwardly toward the points of the hoes, after which it passes over the rear edges thereof and is deposited at a point directly in rear of the center of the machine. A spring-strip 21 is secured to the under surface of the rear end of each arm 12, and the free end thereof bears upon a stock 19 and serves to hold it normally in the position illustrated in Fig. 1. Should, however, the hoe be brought into contact with an unresisting object, the same would be free to swing rearward upon its pivot-pin 22, after which it would be promptly returned to its normal position by its spring 21. Forward movement of each wheel in relation to its arm 12 is prevented by reason of the fact that the adjoining ends of the stocks 9 and arms 12 overlap, as shown in dotted lines in Fig. 4.

To the forward end of the frame, at each side thereof, may be secured a hanger 23, to the lower end of which is fastened a scraper 24. When the machine is drawn forward over rough ground, these scrapers will remove all loose obstructions. The plows following the same will raise the earth and throw it into the paths of the hoes 20. As these hoes come forward the inner edges thereof force down all vegetation in the paths thereof, and the outer ends thereof gather the earth and guide it inward toward the points of the hoes, after which it is discharged over the rear edges thereof and deposited upon the growth which has been felled by said hoes. Each time a recess 9 comes opposite a roller 16 said roller is thrown thereinto by the spring 17, and the hoe connected thereto is promptly swung outward. The recesses 9 are preferably arranged in each disk 8, so as to operate these hoes in unison, and it is obvious that as the machine is drawn along a row of cotton the hoes will force down all vegetation in the path thereof and deposit earth thereon, except at such points as are reached when the recesses 9 arrive in position beside the rollers 16. At such times the hoes will be promptly moved laterally in opposite directions, leaving a portion of the vegetation standing. If it is desired to have the rollers pass over one or more of the recesses 9 without being pressed inward by the springs 17, it is merely necessary to adjust the blocks 10 in said recesses outward until they are brought in alinement with the face of the disks.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a frame having rotary disks mounted therein and adapted to support the frame and having recesses in the outer faces thereof; of arms pivoted to the frame at the outer sides of the disks, hoes pivoted to said arms and extending in rear of the disks, rollers arranged at the forward ends of said arms and adapted to be successively seated within the recesses, and a block adjustably mounted within each recess.

2. In a device of the character described, the combination with a frame having disks mounted therein and serving to support the frame, said disks having recesses in their outer faces; of a plow at each side of the frame, arms pivoted upon the frame at the outer sides of the disks, hoes connected to the arms and extending in rear of the disks and adapted to overlap and force down vegetation in the paths thereof and receive earth from the plows and direct it inward toward the center and upon the vegetation, and rollers at the opposite ends of the arms adapted to be successively seated within the recesses in the disks.

3. In a device of the character described, the combination with a frame having a recessed revoluble disk journaled therein and adapted to support the same; of arms pivoted upon the frame, rollers secured thereto and adapted to be seated within the recesses, a spring-pressed stock pivoted to each of said arms, hoes upon the stocks adapted to overlap in rear of the disk, and means for automatically seating the rollers in the recesses.

In testimony whereof I affix my signature in presence of two witnesses.

WILLIAM D. WILSON.

Witnesses:
JEFF. D. FERGUSON,
JOHN P. THAYER.